(12) United States Patent
Shiga et al.

(10) Patent No.: US 7,130,900 B2
(45) Date of Patent: Oct. 31, 2006

(54) STORAGE NETWORK MANAGEMENT SYSTEM AND METHOD

(75) Inventors: Kenta Shiga, Yokohama (JP); Atsuya Kumagai, Kawasaki (JP); Keisei Fujiwara, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 499 days.

(21) Appl. No.: 10/664,891

(22) Filed: Sep. 22, 2003

(65) Prior Publication Data

US 2005/0044199 A1  Feb. 24, 2005

(30) Foreign Application Priority Data

Aug. 6, 2003  (JP) ............................. 2003-206165

(51) Int. Cl.
*G06F 15/173* (2006.01)

(52) U.S. Cl. ...................................... 709/223; 709/222

(58) Field of Classification Search ................ 709/223, 709/226, 229, 245; 710/8; 370/381
See application file for complete search history.

(56) References Cited

U.S. PATENT DOCUMENTS

| 6,085,238 | A * | 7/2000 | Yuasa et al. ................. 709/223 |
| 6,223,218 | B1 * | 4/2001 | Iijima et al. ................. 709/221 |
| 6,622,220 | B1 * | 9/2003 | Yoshida et al. .............. 711/152 |
| 7,062,559 | B1 * | 6/2006 | Yoshimura et al. ......... 709/226 |
| 2002/0174307 | A1 * | 11/2002 | Yoshida et al. .............. 711/152 |
| 2003/0069972 | A1 * | 4/2003 | Yoshimura et al. ......... 709/226 |
| 2003/0085914 | A1 | 5/2003 | Takaoka et al. |
| 2003/0101239 | A1 | 5/2003 | Ishizaki |
| 2003/0131105 | A1 | 7/2003 | Czeiger et al. |
| 2003/0204583 | A1 * | 10/2003 | Kaneda et al. ............... 709/223 |
| 2003/0212781 | A1 * | 11/2003 | Kaneda et al. ............... 709/223 |
| 2003/0229690 | A1 | 12/2003 | Kitani et al. |
| 2004/0008702 | A1 * | 1/2004 | Someya et al. .............. 370/401 |
| 2004/0117438 | A1 * | 6/2004 | Considine et al. ........... 709/203 |
| 2004/0193677 | A1 * | 9/2004 | Dar et al. .................... 709/203 |
| 2004/0249916 | A1 * | 12/2004 | Graves et al. ............... 709/223 |

FOREIGN PATENT DOCUMENTS

| JP | 2001-53776 | 2/2001 |
| JP | 2003-141055 | 5/2003 |

* cited by examiner

*Primary Examiner*—Abdullahi Salad
(74) *Attorney, Agent, or Firm*—Mattingly, Stanger, Malur & Brundidge, P.C.

(57) ABSTRACT

In a computer system having a storage device, switches and hosts respectively connected by a network, in accordance with an ID of a logical volume of the storage device and an IP address of a host, access control configuration of the logical volume is performed relative to the storage device, the IP address of the host is converted into a MAC address, the MAC address of the host is converted into a port ID of the switch connected to the host, and addition of the port to virtual local area network (VLAN) is performed for the switch. Logical unit number (LUN) masking and VLAN configuration essential for security countermeasure of IP-SAN (Internet protocol-storage area network) can be managed collectively by a system administrator so that the running cost of IP-SAN can be lowered.

11 Claims, 11 Drawing Sheets

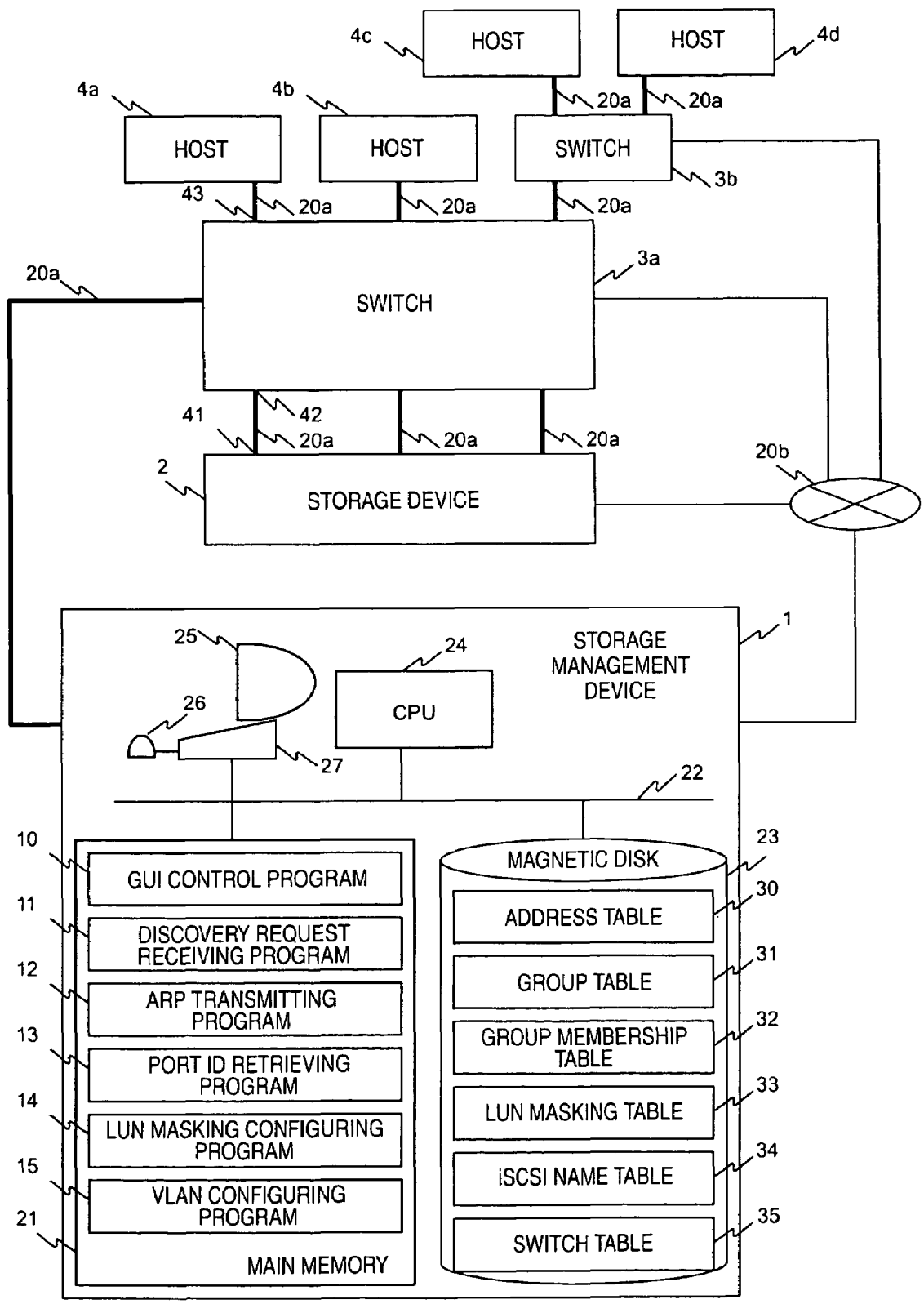

FIG. 2A
ADDRESS TABLE 30

| IP ADDRESS /300 | MAC ADDRESS /301 | SWITCH ID /302 | PORT ID /303 |
|---|---|---|---|
| 192.168.1.1 | 11-22-33-44-55-01 | 3a | 1 |
| 192.168.2.1 | 11-22-33-44-55-02 | 3a | 2 |
| 192.168.1.2 | 11-22-33-44-55-03 | 3b | 1 |
| 192.168.2.2 | 11-22-33-44-55-04 | 3b | 2 |
| ... | ... | ... | ... |

FIG. 2B
GROUP TABLE 31

| GROUP ID /310 | SUBNET ADDRESS /311 |
|---|---|
| 1 | 192.168.1.0/24 |
| 2 | 192.168.2.0/24 |
| ... | ... |

FIG. 2C
GROUP MEMBERSHIP TABLE 32

| GROUP ID /320 | ADDRESS /321 | TYPE /322 | CONNECTION FLAG /323 |
|---|---|---|---|
| 1 | iqn.2000-02.com.hitachi:users:test1 | TARGET | 1 |
| 1 | 192.168.1.1 | INITIATOR | 1 |
| 1 | 192.168.1.2 | INITIATOR | 0 |
| 2 | 192.168.2.1 | INITIATOR | 0 |
| ... | ... | ... | ... |

FIG. 3A

LUN MASKING TABLE 33

| iSCSI NAME | LUN | IP ADDRESS |
|---|---|---|
| iqn.2000-02.com.hitachi:users:test1 | 1 | 192.168.1.1 |
| iqn.2000-02.com.hitachi:users:test1 | 1 | 192.168.1.2 |
| . . . | . . . | . . . |

FIG. 3B iSCSI NAME TABLE 34

| iSCSI NAME | IP ADDRESS | PORT NUMBER |
|---|---|---|
| iqn.2000-02.com.hitachi:users:test1 | 192.168.1.254 | 3260 |
| iqn.2000-02.com.hitachi:users:test2 | 192.168.2.254 | 3260 |
| . . . | . . . | . . . |

FIG. 3C

SWITCH TABLE 35

| SWITCH ID | MANAGEMENT IP ADDRESS |
|---|---|
| 3a | 192.168.0.1 |
| 3b | 192.168.0.2 |
| . . . | . . . |

LUN MASKING CONFIGURATION WINDOW 400

GROUP REGISTRATION WINDOW 420

COMMUNICATION SEQUENCE TO BE PERFORMED WHEN PHYSICAL PORT OF STORAGE DEVICE IS CONNECTED TO SWITCH

COMMUNICATION SEQUENCE TO BE PERFORMED WHEN HOST IS CONNECTED TO SWITCH

COMMUNICATION SEQUENCE TO BE PERFORMED WHEN PHYSICAL PORT OF STORAGE DEVICE OR HOST IS DISCONNECTED FROM SWITCH

STORAGE NETWORK MANAGEMENT SYSTEM AND METHOD

BACKGROUND OF THE INVENTION

1. Field of the Invention

The present invention relates to a system constituted of a storage device connected to a network and a plurality of information processing apparatuses.

2. Description of the Related Art

Attention has been paid recently to network storage technology, IP-SAN (Internet Protocol-Storage Area Network), which uses an IP network whose initial cost is cheaper than that a network using Fibre Channel (hereinafter abbreviated to "FC"). The IP network requires, however, an additional cost for maintaining security because many security threatening crack tools are circulated.

As the security countermeasure for a conventional FC-SAN, LUN (Logical Unit Number) masking has been used. The LUN masking is the technique according to which access from a computer to a logical unit (Logical Unit, hereinafter abbreviated to LU) of a storage device is restricted by the storage device to prevent illegal data reference, alteration and erase.

If the LUN masking technique of FC-SAN is to be realized in IP-SAN, a computer accessible to each LUN of a storage device is designated by an IP address assigned to the computer. It is, however, easy to tap a packet sent/received to/from another computer connected to the same subnet in the IP network. Therefore, if the same network is shared by two or more departments or businesses, data security is impossible to be ensured, and the configuration of only the LUN masking is insufficient for the security countermeasure. It is therefore necessary to use other security techniques together with the LUN masking.

A candidate for the security technique to be used with the LUN masking may be data cryptograph utilizing IPSec techniques or the like. However, a cryptography process has a large load on a CPU. If this process is applied to IP-SAN, the I/O performance of a storage device is degraded. In order to suppress such performance degradation, although the cryptography process may be executed by using dedicated hardware, this approach is unsatisfactory for the security technique to be used together with the LUN masking because it requires a high initial cost.

Another candidate for the security technique may be VLAN (Virtual Local Area Network) techniques according to which one physical network is divided into a plurality of logical networks. With the VLAN techniques, one or more computers such as those used by the same department posing no problem of data tapping are classified into one group. Each group is assigned a logical network to prevent data tapping by other groups. VLAN has been adopted by most of LAN switches so that there is no additional initial cost. It can therefore be expected that a combination of LUN masking and VLAN technologies will be used as the security countermeasure of IP-SAN.

Techniques of reducing the load of configuring VLAN are disclosed in JP-A-2001-53776.

The configuration work of LUN masking and VLAN is required to be performed not only on the side of a storage device but also on the side of switches in IP-SAN. Since the configuration work is required on the sides of different devices, a system user or administrator has a large work load.

In the configuration work of LUN masking, a computer is designated by an IP address (or domain name), whereas in the configuration work of VLAN, it is necessary to designate a computer by a port ID for identifying a port of a connection destination switch. Since the configuration works of LUN masking and VLAN designate a computer by using different IDs, a configuration miss is likely to occur.

The techniques disclosed in the above-cited JP-A-2001-53776 automatically perform the configuration work of VLAN when a switch to which a computer is connected is changed, and do not solve the above-described problem.

SUMMARY OF THE INVENTION

An object of this invention is to provide a system capable of facilitating the configuration of VLAN and LUN masking.

According to one embodiment of the invention, a management method for a storage system having a storage device, a switch and a computer respectively connected by a network, comprises a step of, in accordance with an identifier of a storage area of the storage device and a first address of the computer, performing a configuration of an access control to the storage area of the storage device, converting the first address of the computer into a second address, converting the second address of the computer into an identifier of a port of the switch connected to the computer, and adding the identifier of the port to a virtual LAN for the switch.

According to the embodiment, as a system administrator configures LUN masking and enters a subnet address of VLAN to which the computer and storage device belong and when the computer or storage device is connected to the network, a storage management device automatically configures VLAN.

Other objects, features and advantages of the invention will become apparent from the following description of the embodiments of the invention taken in conjunction with the accompanying drawings.

BRIEF DESCRIPTION OF THE DRAWINGS

FIG. 1 is a diagram showing an example of a system configuration according to a first embodiment.

FIGS. 2A to 2C are tables showing data structures.

FIGS. 3A to 3C are tables showing data structures.

DESCRIPTION OF THE EMBODIMENTS

Figure 4A:
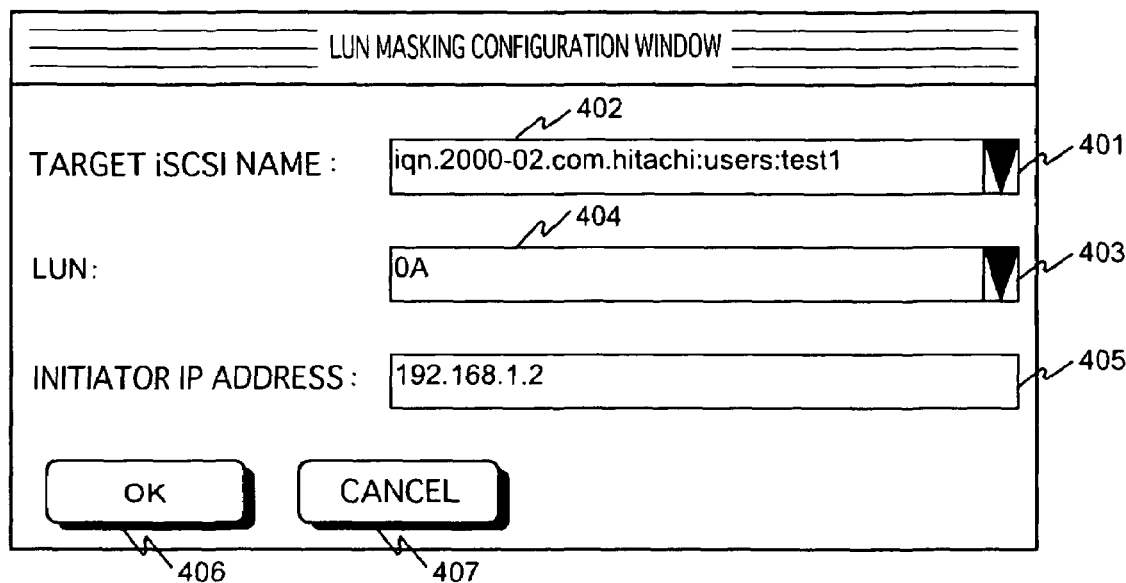
FIGS. 4A and 4B are examples of a window for registering a group.

Embodiments of the invention will be described with reference to the accompanying drawings. In the drawings, similar devices are represented by identical reference numerals.

First, description will be made on a computer system according to a first embodiment of the invention. In the first embodiment, IP-SAN security is managed by a storage management device which manages the configuration of a storage device and monitors the storage device.

FIG. 1 is a diagram showing an example of the system configuration of the first embodiment. A computer system has a storage management device 1, a storage device 2, switches 3 for switching packets, and hosts 4, respectively interconnected by communication lines 20*a*.

The storage device 2 is constituted of a single storage device or a plurality of storage devices constituting a storage system. The storage device may be a non-volatile storage device such as a hard disk and a DVD. The storage system may adopt a RAID configuration. The storage device 2 has physical ports 41 for connection to the switch 3 or host 4 via the communication line 20*a*.

The host 4 is a general computer having an arithmetic unit, a memory, an input/output unit and the like. The host 4 has a physical port for connection to another device via the communication line 20*a*.

The switch 3 transfers data sent by the host 4 or storage device 2 to another device. The switch 3 has physical ports 42 for connection to the storage device 2 and physical ports 43 for connection to the host 4 or another switch 3. Although the physical ports 42 and 43 are not required to be physically discriminated, they are discriminated herein for the purpose of description simplicities.

It is assumed that the storage management device 1, storage device 2 and switches 3 are interconnected by communication lines 20*b* on which monitor and maintenance data flow. Instead of using the communication lines 20*b*, the monitor and maintenance data may be transferred via the communication lines 20*a*. In this embodiment, although the embodiment has two switches 3 and four hosts 4, the numbers of switches and hosts are arbitrary.

The storage device 2 can become an iSCSI target. The storage device 2 has a controller which receives configuration information of LUN masking from an external to perform the configuration of LUN masking.

The switch 3 has a controller which receives configuration information of VLAN from an external to perform the configuration of VLAN. The controller of the switch 3 sends a forwarding database in response to a request from an external and notifies link-down to an external.

The storage management device 1 is a general computer. The storage management device 1 has: a central processing unit (hereinafter abbreviated to "CPU") 24, a secondary storage device 23 (hereinafter abbreviated to "magnetic disk") such as a hard disk; a main storage memory (hereinafter abbreviated to "main memory") 21, communication lines 22 such as buses and crossbar switches; an output device 25 (hereinafter called "display") such as a display device, a character input device 27 such as a keyboard; and a pointing device 26 such as a mouse. The storage management device 1 has also interfaces for connection to the communication lines 20*a* and 20*b*.

The main memory 21 stores various programs to be executed by CPU 24. More specifically, the programs include: a GUI control program 10 to be executed by CPU 24 when a graphical user interface is supplied to a system administrator; a discovery request receiving program 11 to be executed when registration is received from an iSCSI target and when a discovery request of an iSCSI target from an iSCSI initiator (host) is received and responded; an ARP transmitting program 12 to be executed when the storage management device 1 performs translation between an IP address and a MAC address by using ARP (Address Resolution Protocol, RFC826); a port ID retrieving program 13 to be executed when a forwarding database is retrieved from the switch 3 and the MAC address is converted into a port ID which is an ID of a physical port; a LUN masking configuring program 14 to be executed when the LUN masking is configured for the storage device 2; and a VLAN configuring program 15 to be executed when the VLAN configuration is performed for the switch 3.

The forwarding database is a correspondence table showing the relation between a port ID of a physical port 42 (or 43) of the switch 3 and a MAC address of a device connected to the physical port. An IP address is an identifier assigned to each device when the Internet protocol is incorporated as the protocol for the communication lines 20. A MAC address is a specific identifier assigned to each device.

The iSCSI initiator is a device autonomously issuing an iSCSI command and corresponds to the host 4 in this embodiment. An iSCSI target is a device which is a communication partner of the iSCSI initiator, and corresponds to the storage device 2, LU therein or the like in this embodiment.

The above-described programs are stored in the magnetic disk 23 in advance, by reading them from a portable recording medium or by downloading them from another computer via the network. These programs are loaded in the main memory 21 when it becomes necessary, and executed by CPU 24. These programs may be implemented as dedicated hardware.

The magnetic disk 23 stores the following tables. An address table 30 stores the correspondence among an IP address and a MAC address corresponding to the physical port of the host 4 or storage device 2, and a port ID of a physical port of the switch connected to the physical port of the host 4 or storage device 2. A group table 31 stores an ID of a group constituted of an iSCSI initiator and an iSCSI target (these are collectively called "iSCSI node") and a subnet address of VLAN to which the group belongs. A group membership table 32 stores an IP address of the iSCSI initiator constituting the group and an iSCSI name of the iSCSI target. A LUN masking table 33 stores an IP address of an iSCSI initiator accessible to the iSCSI target and each LU thereof. An iSCSI name table 34 stores a correspondence between the name of an iSCSI target and an IP address. A switch table 35 stores an IP address of a management physical port of each switch.

Each group is constituted of one or more iSCSI initiators such as a host 4 used by the same department or business which poses no problem of data tapping, and an iSCSI target used by the iSCSI initiators.

Brief description will first be made on the operation of the storage management device 1 of the first embodiment. First, a system administrator registers switches 3 installed in the computer system in the switch table 35. Next, the system administrator registers groups in the group table 31. Thereafter, when the storage device 2 is connected to the switch, the storage management device 1 judges the group to which the connected storage device 2 belongs, adds the storage device 2 to the group as a member, and instructs the switch 3 to add the storage device 2 to VLAN corresponding to the group.

Next, as the system administrator performs the configuration of LUN masking, the storage management device 1 instructs the storage device 2 to perform the configuration of LUN masking, judges the group of the host 4 designated by LUN masking, and adds the host to the group as a member. As the host 4 is connected to the switch 3 thereafter, the storage management device 1 instructs the switch 3 to add the host 4 to VLAN of the group to which the host 4 belongs.

Next, description will be made on the data structure of each table stored in the magnetic disk 23 of the storage management device 1.

Each of the address table 30, group table 31, group membership table 32, LUN masking table 33, iSCSI name table 34 and switch table 35 has the array structure capable of registering one or more records.

FIG. 2A is a table showing an example of the data structure of the address table 30. The address table 30 has one record per each physical port of the host 4 and storage device 2. Each record has the following entries. An entry 300 registers an IP address assigned to the physical port corresponding to the record. An entry 301 registers a MAC address assigned to the physical port corresponding to the record. An entry 302 resisters a switch ID which is an identifier of the switch 3 connected to the physical port corresponding to the record. An entry 303 resisters a port ID of the physical port of the switch connected to the physical port corresponding to the record.

FIG. 2B is a table showing an example of the data structure of the group table 31. The group table 31 has one record per each group. Each record of the group table 31 has the following entries. An entry 310 registers a group ID which is an identifier of the group corresponding to the record. An entry 311 registers a subnet address of VLAN to which the iSCSI initiator and iSCSI target constituting the group corresponding to the record belong. In this embodiment, since the group ID is also used as VLAN ID, it is assumed that the group ID takes an integer value from 1 to 4096.

FIG. 2C is a table showing an example of the data structure of the group membership table 32. The group membership table 32 has one record per each iSCSI node. Each record has the following entries. An entry 320 resisters a group ID of a group belongs to which is the iSCSI node corresponding to the record. An entry 321 registers an IP address of the iSCSI node corresponding to the record. An entry 322 registers discrimination information indicating whether the iSCSI node corresponding to the record is an iSCSI initiator or an iSCSI target. An entry 323 registers information of a connection flag indicating whether or not the iSCSI node corresponding to the record is connected to the communication line 20*a*.

In this embodiment, it is assumed that the information registered in the entry 322 is either "initiator" or "target". It is also assumed that the information registered in the entry 323 is "1" if the iSCSI node corresponding to the record is connected to the communication line 20*a*, and "0" if not.

FIG. 3A is a table showing an example of the data structure of the LUN masking table 33. The LUN masking table 33 has one record per each iSCSI name given to the iSCSI target. Each record has the following entries. An entry 330 registers an iSCSI name corresponding to the record. An entry 331 registers LUN of LU contained in the iSCSI target designated by the iSCSI name corresponding to the record. A entry 332 registers an IP address of an iSCSI initiator accessible to LU registered in the entry 331.

FIG. 3B is a table showing an example of the data structure of the iSCSI name table 34. The iSCSI name table 34 has one record per each iSCSI name given to the iSCSI target. Each record has the following entries. An entry 340 registers an iSCSI name corresponding to the record. An entry 341 registers an IP address of the iSCSI target designated by the iSCSI name corresponding to the record. An entry 342 resisters a port number of the iSCSI target designated by the iSCSI name corresponding to the record.

FIG. 3C is a table showing an example of the data structure of the switch table 35. The switch table 35 has one record per each switch 4 in the system. Each record has the following entries. An entry 350 registers a switch ID for identifying the switch 3 corresponding to the record. An entry 351 registers a management IP address assigned to a management physical port of the switch corresponding to the record.

Graphical user interfaces (hereinafter abbreviated to "GUI") used by the embodiment will be described. These GUIs are displayed on the display 25 when the storage management device 1 executes the GUI control program 10. A system administrator or the like sets each parameter on the displayed GUI by using the character input device 27 or pointing device 26.

The display 25, character input device 27 and pointing device 26 may be other devices different from those of the storage management device 1. For example, a console terminal connected to the storage management device 1 via the communication line 20*b* or serial cable may have the display 25 and the like. In this case, the storage management device 1 executes the GUI control program 10, and sends screen data to the console terminal which in turn displays GUI on the display 25.

The console terminal sends each parameter set by a system administrator or the like via the character input device 27 or pointing device 26 to the storage management device 1. The storage management device 1 may be provided with a command line interface having the equivalent function to that of GUI, instead of using GUI of this embodiment.

FIG. 4A is a diagram showing an example of an LUN masking configuration window 400 to be used for the configuration of LUN masking by a system administrator. The LUN masking configuration window 400 has: a button 401 for selecting an iSCSI name of an iSCSI target; an area 402 for displaying the iSCSI name selected by the button 401; a button 403 for selecting an LUN in the iSCSI target; an area 404 for displaying the LUN selected by the button 403; an area 405 for entering an IP address of an iSCSI initiator; a button 406 for registering information designated in these areas and by these buttons; and a button 407 for cancelling the registration.

Description will be given on the operation of the storage management device 1 to be performed when LUN masking is configured by a GUI operation. The following operation is performed by execution of the GUI operation program 10.

When a system administrator or the like depresses the button 406 by using the pointing device or the like, the storage management device 1 adds a new record to the LUN masking table 33 in accordance with the contents displayed in the areas 402, 404 and 405.

Next, the storage management device 1 checks, for each record in the group table 31, whether the IP address entered in the area 405 belongs to the subnet address registered in the entry 311. If it belongs to the subnet, a record is added to the group membership table 32. In this case, the group ID in the entry 310 of the record in the group table 31 is registered in the entry 320 of the record to be added, the contents in the area 405 are registered in the entry 321, "initiator" is registered in the entry 322, and "0" is registered in the entry 323.

If the IP address entered in the area 405 belongs to the subnet of some record in the group table 31, the storage management device 1 further checks whether the iSCSI target having the iSCSI name entered in the area 402 is registered in the group membership table 32. If not registered, a record is added to the group membership table 32. In this case, the group ID of the entry 310 of the record in the group table 31 is registered in the entry 320 of the record to be added, the contents in the area 401 are registered in the entry 321, "target" is registered in the entry 322, and "0" is registered in the entry 323.

Lastly, the storage management device 1 executes the LUN masking configuring program 14, and instructs the storage device 2 to configure LUN masking. Specifically, the storage management device 1 sends the information registered in the LUN masking table 33 to the storage device 2 so that the LUN masking is configured in accordance with the sent information. More specifically, the storage management device 1 sends an instruction to the controller of the storage device 2 so that an access is permitted from the host 4 designated by the designated IP address to the target having the designated iSCSI name.

Figure 4B:
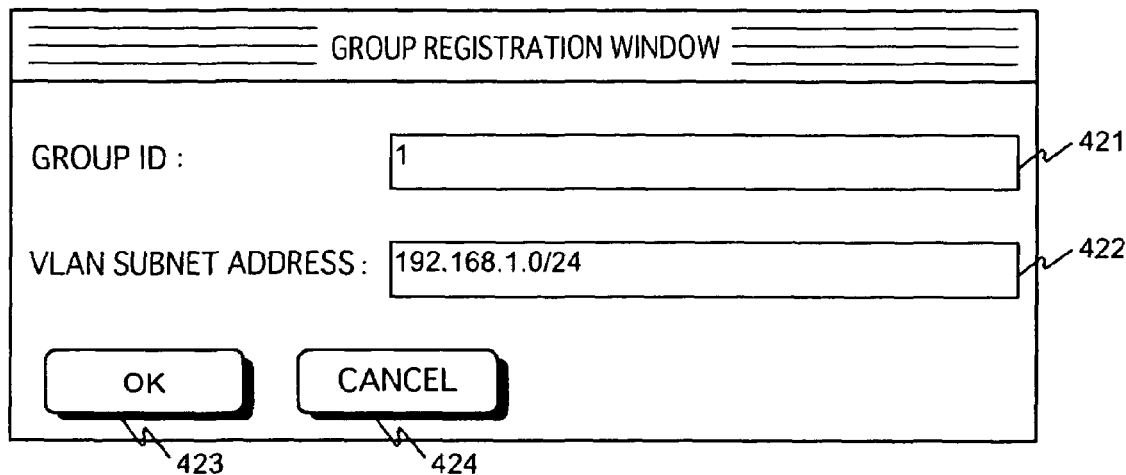

FIG. 4B is a diagram showing an example of a group registration window 420 to be used for the registration of a group by a system administrator. The group registration window 420 has: an area 421 for entering a new group ID by a system administrator; an area 422 for entering a subnet address of VLAN to which the iSCSI nodes constituting the group belong; a button 423 for registering the information designated in these areas; and a button 424 for cancelling the registration.

Next, description will be made on the operation of the storage management device 1 to be performed when a group is registered by a GUI Operation. The operation is also performed by execution of the GUI control program 10.

When a system administrator or the like depresses the button 423 of the group registration window 420 by using the pointing device or the like, the storage management device 1 adds a new record to the group table 31. The contents in the area 421 are registered in the entry 310 of the record to be added, and the contents in the area 422 are registered in the entry 311.

Next, the storage management device 1 selects a record having the IP address belonging to the subnet in the area 422 from the LUN masking table 33. In accordance with the information in the selected record, the storage management device 1 adds a record of the iSCSI initiator and a record of the iSCSI target to the group membership table 32. The contents in the area 421 are registered in the entry 320 of the record of the iSCSI initiator to be added, the IP address registered in the entry 332 is registered in the entry 321, "initiator" is registered in the entry 322, and "0" is registered in the entry 323. The contents in the area 421 are registered in the entry 320 of the record of the iSCSI target to be added, the iSCSI name in the entry 330 is registered in the entry 321, "target" is registered in the entry 322, and "0" is registered in the entry 323.

Figure 5:
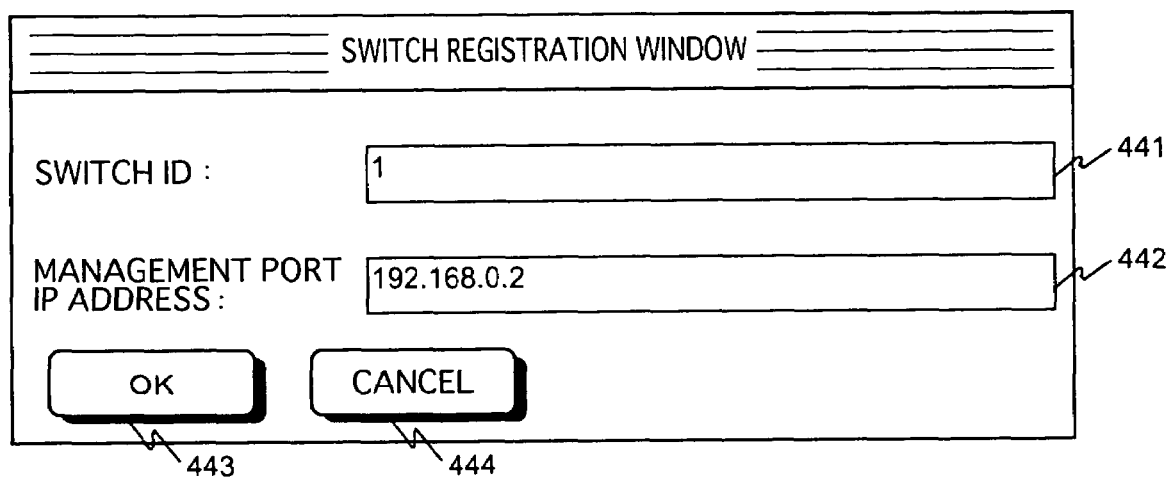
FIG. 5 is an example of a window for configuring LUN masking and registering a switch.

FIG. 5 is a diagram showing an example of a switch registration window 440 to be used for the registration of a management port of each switch in the computer system by a system administrator or the like. The switch registration window 440 has: an area 441 for entering a switch ID; an area 442 for entering an IP address of a management port of the switch; a button 443 for registering the information designated in these areas; and a button 444 for cancelling the registration.

Next, description will be given on the operation of the storage management device 1 to be performed when a switch is registered by a GUI Operation by a system administrator.

When a system administrator or the like depresses the button 443 by using the pointing device or the like, the storage management device 1 adds a new record to the switch table 35 in accordance with the parameters designated by the buttons.

Next, a communication sequence among these devices of the embodiment will be described. The communication lines 20a for interconnecting the storage management device 1 and switch 3a are assumed to be configured so that the communication lines belong to a default VLAN having the VLAN ID of "0". It is also assumed that VLAN trunks are configured to be connected to the physical ports of the switch 3a connected to another switch 3b.

Figure 6A:
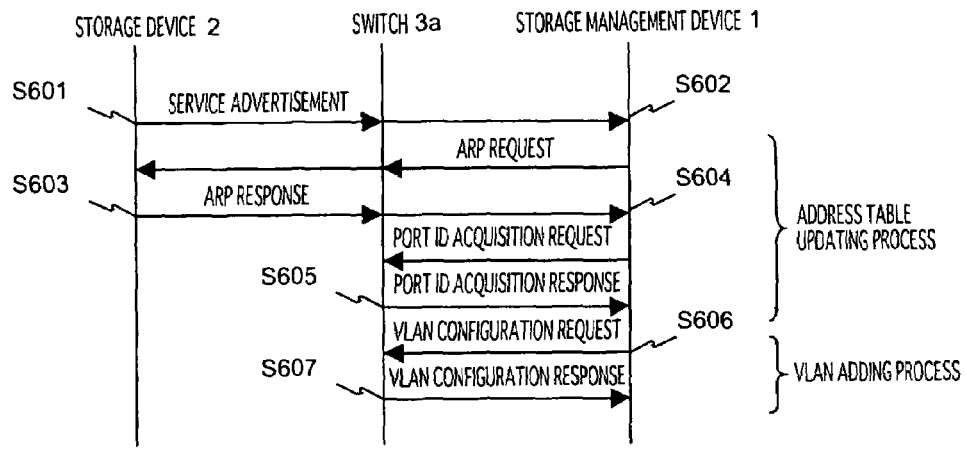
FIGS. 6A to 6C illustrate a communication sequence of the first embodiment.

FIG. 6A is a diagram illustrating a communication sequence to be performed when a physical port of the storage device 2 is connected to the switch 3 wherein the physical port 41 of the storage device 2 is connected to the physical port 42 of the switch 3a.

First, when the storage device 2 detects a link establishment, it registers an iSCSI target to a discovery service. The discovery service is a service of retrieving a list of iSCSI targets usable by an iSCSI initiator. IETF proposes that this service is implemented by using SLP (Service Location Protocol, RFC2608) or iSNS (Internet Simple Name Service).

In this embodiment, it is assumed that the storage management device 1 functions as a directory agent of SLP. The invention is also applicable to iSNS. If SLP is used, an iSCSI target is registered by sending a service advertisement packet. This service advertisement packet contains an iSCSI name, an IP address, a port number and the like, respectively of the iSCSI target. At this stage, the communication line 20a interconnecting the physical ports 41 and 42 belongs to the default VLAN (VLAN ID="0") (S601).

Upon reception of the service advertisement from the iSCSI target, the storage management device 1 adds a record to the iSCSI name table 34 in accordance with the contents of the service advertisement, and executes an address table updating process (from S602 to S605).

The details of the address table updating process will be given. First, the storage management device 1 broadcasts an ARP request via the communication lines 20a. At this time, since the communication line 20a interconnecting the storage management device 1 and switch 3a and the communication line 20a interconnecting the physical ports 41 and 42 belong to the same VLAN, the broadcast packet reaches the physical port 41 (S602).

Upon reception of the broadcast packet, the storage device 2 sends an ARP response including a MAC address of the physical port 41 to the storage management device 1. The storage management device 1 can therefore acquire the MAC address corresponding to the IP address of the iSCSI target (S603).

Next, the storage management device 1 acquires the forwarding database via the switch 3a and communication line 20b to obtain the port ID (port ID of the physical port 42) corresponding to the MAC address.

Thereafter, the storage management device 1 stores the correspondence relation between the IP address and MAC address of the physical port 41 and the port ID of the physical port 42 connected to the physical port 41, respectively acquired in the manner described above, in the address table 30 (S604, S605).

Lastly, the storage management device 1 executes a VLAN adding process. In this VLAN adding process, the storage management device 1 searches the group membership table 32 by using as a search key the iSCSI name of the iSCSI target contained in the service advertisement packet received at Step S601, to thereby acquire the group ID of the group to which the iSCSI target belongs. The storage management device 1 instructs via the communication lines 20b the switch 3a to configure VLAN in such a manner that the physical port 42 belongs to VLAN having the group ID as its VLAN ID (S606, S607).

Figure 6B:
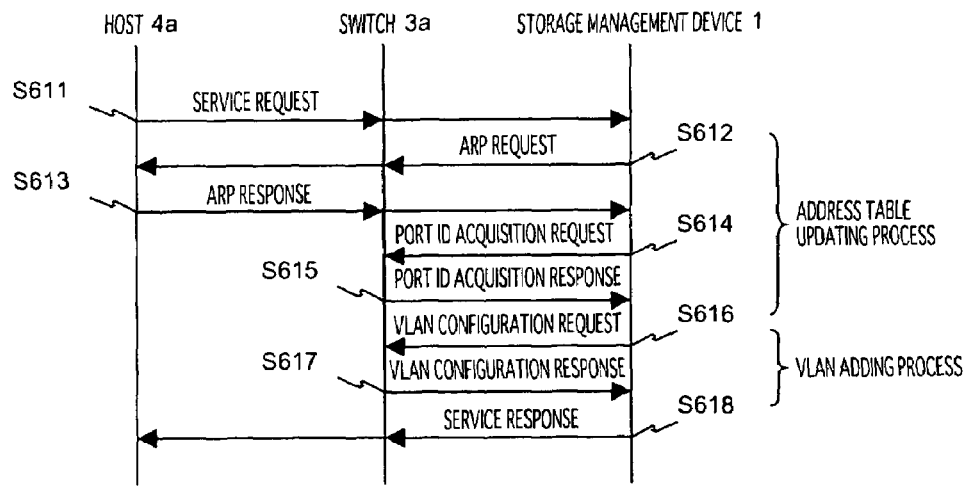

FIG. 6B is a diagram illustrating a communication sequence to be performed when the host 4 is connected to the switch 3 wherein a host 4a is connected to the switch 3a.

In this communication sequence, first the host 4a sends a service request to the storage management device 1 to acquire a usable iSCSI target (S611) and lastly the storage management device 1 sends the usable iSCSI target to the host 4a via the communication line 20a (S618). The other communication sequence is similar to that shown in FIG. 6A. In the communication sequence to be performed when the host 4c or 4d is connected to the switch 3b, the switch 3b is inserted between the host 4 and switch 3a, and the other communication sequence is similar to that shown in FIG. 6A.

Figure 6C:
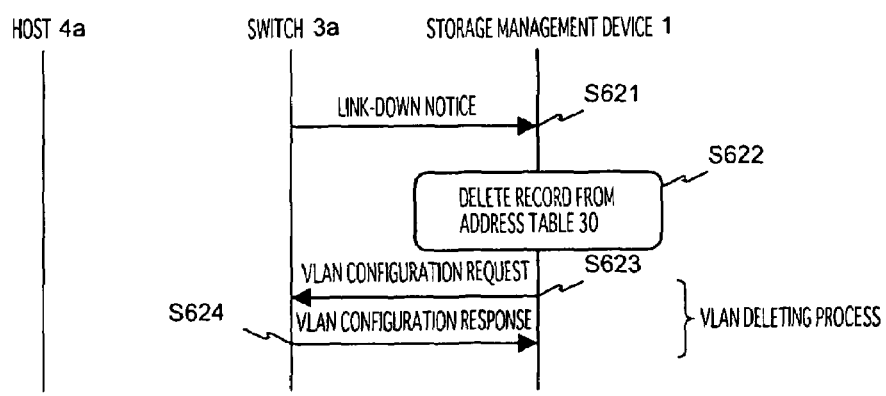

FIG. 6C is a diagram illustrating a communication sequence to be performed when the physical port of the storage device 2 or host 4 is disconnected from the switch wherein a host 4a is disconnected from the switch 3a.

The switch 3a detected disconnection of a link to the host 4a sends a link-down notice to the storage management device 1 via the communication line 20b by using a means such as SNMPTrap. It is assumed that the link-down notice contains the port ID of the physical port which was linked down (S621).

Upon reception of the link-down notice, the storage management device 1 derives information of the source IP address (IP address of the sender switch) and the port ID from the link-down notice. The storage device unit 1 searches the switch table 35 by using the source IP address as a search key to acquire the switch ID from the coincident record. The storage management device 1 further searches the address table 30 by using as a search key a combination of the acquired port ID and switch ID to save the IP address in the coincident record in an arbitrary area of the main memory 21 in order to use it in the VLAN deleting process, and thereafter deletes the record (S622).

Lastly, the storage management device 1 performs the VLAN deleting process. In the VLAN deleting process, the storage management device 1 sends a VLAN configuration request to the switch 3a via the communication line 20b in order to delete the physical port of the host 4 or storage device 2 whose link was disconnected (S623, S624).

Next, the details of the address updating process, VLAN adding process and VLAN deleting process described with reference to FIGS. 6A to 6C will be described.

Figure 7:
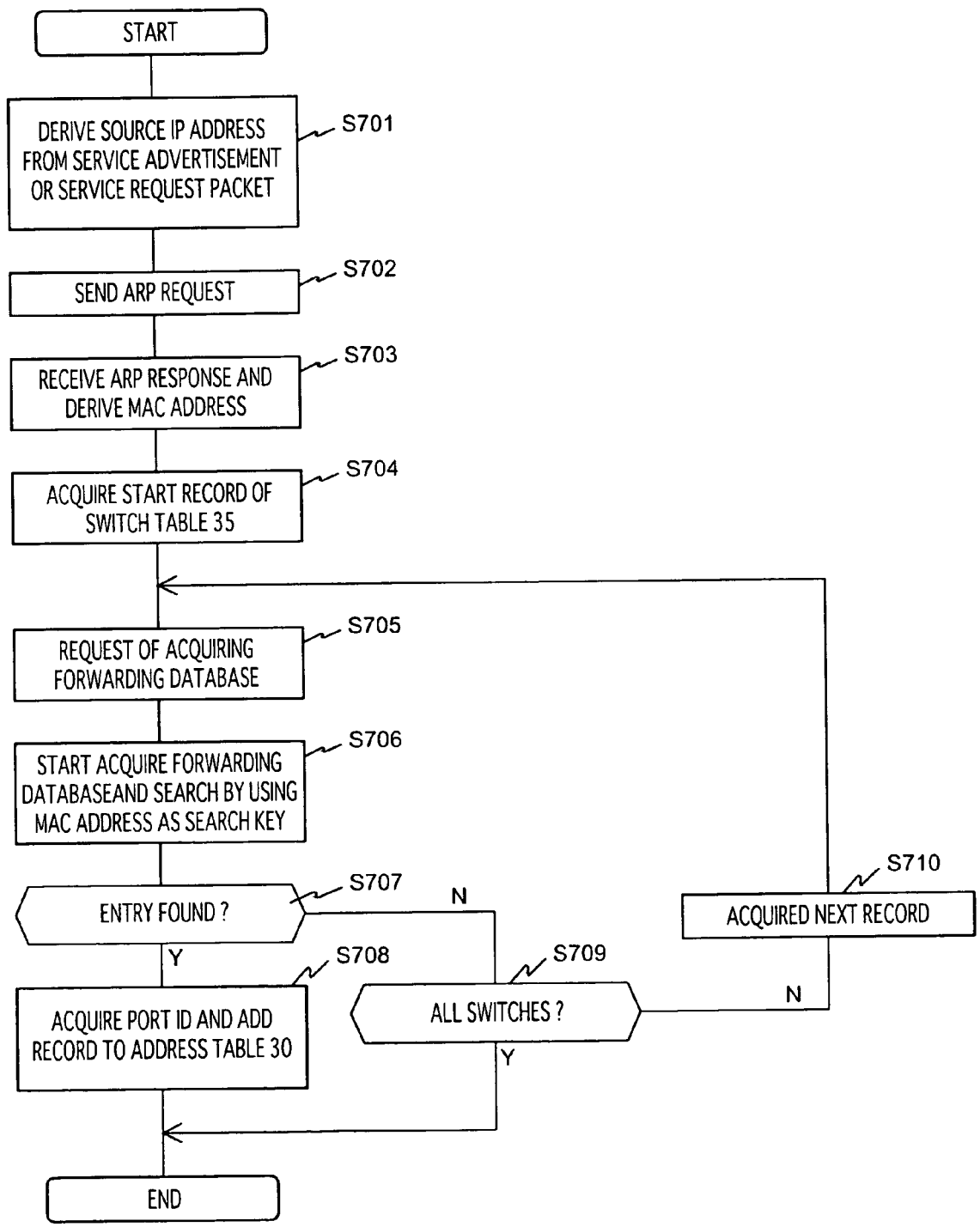
FIG. 7 is a flow chart illustrating the operation of an address table updating process.

FIG. 7 is a flow chart illustrating the operation of the address table retrieving process to be performed by the storage management device 1.

Upon reception of the service advertisement packet or service request packet, the storage management device 1 executes the service request reception program 11 to acquire an IP address of a packet sender from the received service advertisement packet or service request packet (S701).

Next, the storage management device 1 executes the ARP sending program 12 to assemble an ARP request of inquiring the MAC address of the IP address obtained at S701 and to broadcast it via the communication lines 20a (S702). Upon reception of the ARP response to the ARP request issued at S702, the storage management device 1 executes the ARP sending program 12 to derive the MAC address from the ARP response (S703).

Next, the storage management device 1 executes the port ID acquiring program 13 to fetch the first record of the switch table 35 (S704) and to send an acquisition request of the forwarding database to the management IP address of the record via the communication line 20b. For example, the acquisition request of the forwarding database can be realized by acquiring an ipNetToMediaTable of MIB-2 (Management Information Base-2, RFC1213) by using Get of SNMP (Simple Network Management Protocol) (S705).

Thereafter, the storage management device 1 searches the acquired forwarding database by using the MAC address acquired at S703 as a search key (S706). If a corresponding entry is found (S707), the storage management device 1 adds a new record to the address table 30, by entering the IP address acquired at S701, the MAC address acquired at S703, the switch ID of the record acquired at S704 and the port ID of the entry acquired at S707 (S708).

If a corresponding entry is not found at S707, the storage management device 1 repeats S705 to S707 for all records in the switch table 35 (S709, S710).

Figure 8:
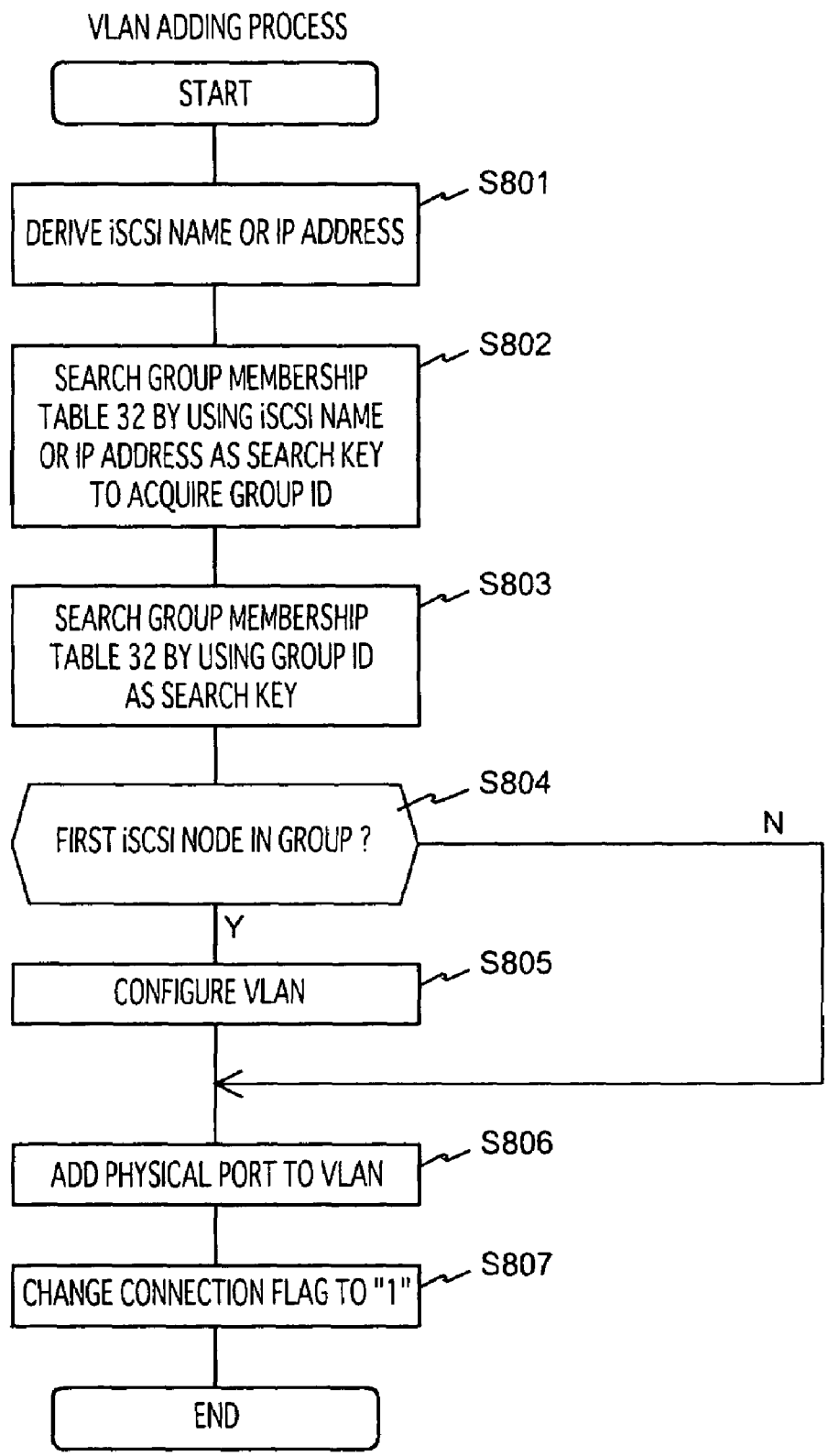
FIG. 8 is a flow chart illustrating the operation of a VLAN adding process.

FIG. 8 is a flow chart illustrating the operation of the VLAN adding process to be performed by the storage management device 1.

First, the storage management device 1 executes the VLAN configuring program 15 to derive the iSCSI name of the iSCSI target or the IP address of the iSCSI initiator from the service advertisement packet or the service request packet respectively received at S701 shown in FIG. 7 (S801).

The storage management device 1 searches the group membership table 32 to obtain a group ID, by using as a search key the iSCSI name of the IP address respectively acquired at S801 (S802).

Next, the storage management device 1 searches again the group membership table 32 by using the group ID acquired at S802 as a search key (S803). If this search result indicates that the iSCSI target or the iSCSI initiator used as a key for searching the group ID is the first iSCSI node of the group, i.e., if the search at S803 indicates that the values of the connection flags in the entries 323 of all records are "0" (S0804), the storage management device 1 sends a VLAN configuring request of creating a VLAN having the group ID acquired at S802 as its VLAN ID, to the switch via the communication line 20b (S805).

After the step at S805 or if the value in the entry 323 of any record is "1" at S804, the storage management device 1 sends a VLAN adding request of adding the port ID acquired at S707 shown in FIG. 7 to the created (or already existing) VLAN via the communication line 20b. The destination of this VLAN configuring request or VLAN adding request is the management IP address 351 of the record acquired at S704 or S710 shown in FIG. 7 (S806).

Thereafter, if necessary, the storage management device 1 may send a packet for storing or validating the switch configuration to the switch 3. Lastly, the storage management device 1 changes the value in the entry of the record matching the search conditions at S802 to "1" (S807).

Figure 9:
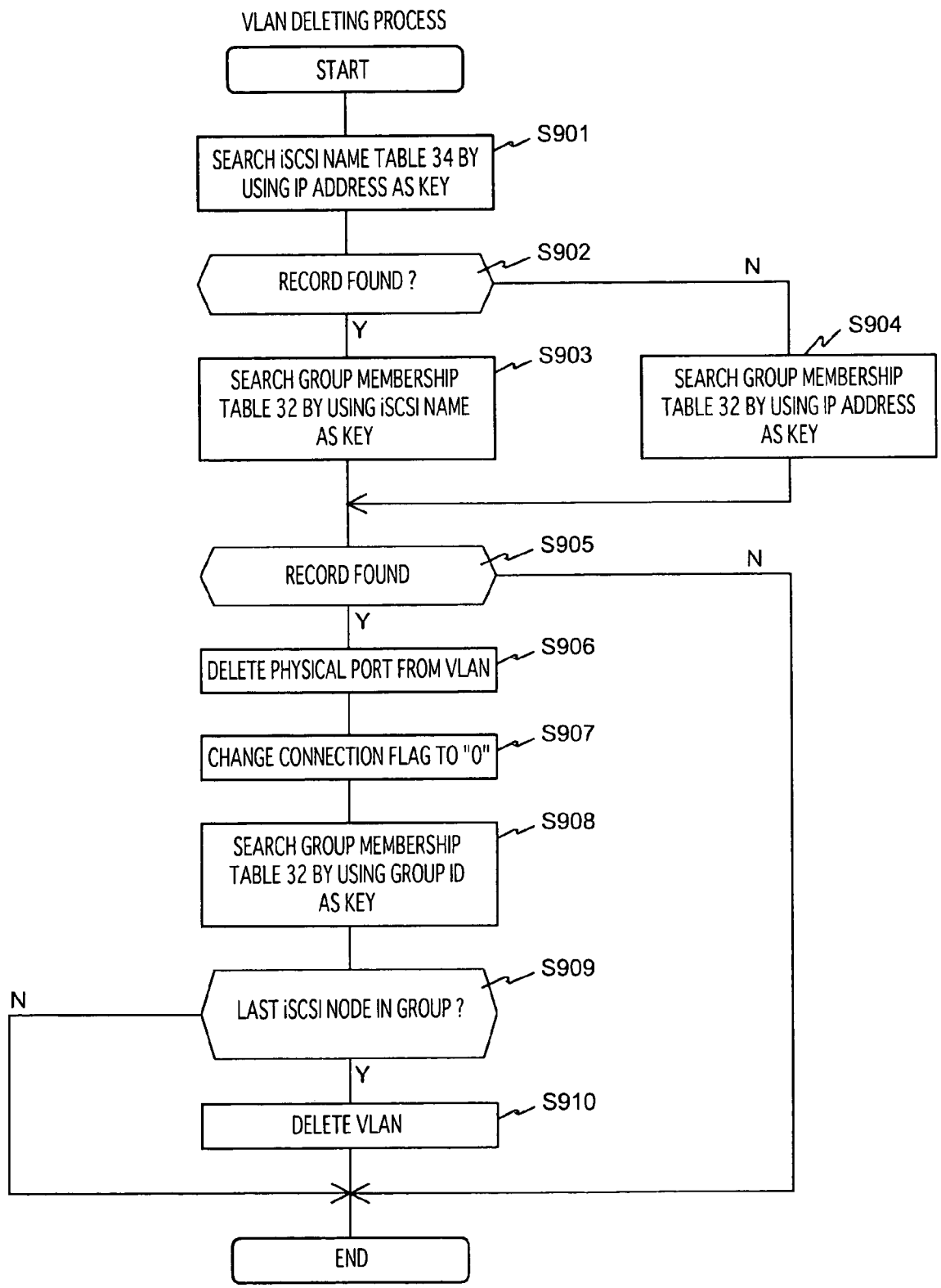
FIG. 9 is a flow chart illustrating the operation of a VLAN deleting process.

FIG. 9 is a flow chart illustrating the operation of the VLAN deleting process to be performed by the storage management device 1.

First, the storage management device 1 executes the VLAN configuring program 15 to search the iSCSI name table 34 by using as a search key the IP address saved at S622 of FIG. 6C (S901). If the search at S901 finds a record (S902), the storage management device 1 judges that the iSCSI target was disconnected from the communication line 20, derives the iSCSI name 340 from the record, and searches the group membership table 32 by using the iSCSI name as a search key (S903).

If the search at S901 does not find a record (S902), the storage management device 1 judges that the iSCSI initiator was disconnected from the communication line 20, and searches the group membership table 32 by using as a search key the IP address (S904).

If the search at S903 or S904 does not find a record (S905), the storage management device 1 terminates the process. If a record is found at S905, the storage management device 1 derives the group ID from the found record. The storage management device 1 sends a VLAN releasing request to the switch via the communication line 20b, the VLAN releasing request deleting the port ID contained in the link-down notice at S621 shown in FIG. 6C from the VLAN having the derived group ID as its VLAN ID (S906).

The storage management device 1 changes the value in the entry 323 of the searched record at S903 or S904 to "0" (S907).

Next, the storage management device 1 searches again the group membership table 32 by using the group ID acquired at the preceding step as a search key (S908). If this search result indicates that the iSCSI target or iSCSI initiator is the last iSCSI node of the group, i.e., if the search at S908 indicates that the values of the connection flags in the entries 323 of all records are "0" (S909), the storage management device 1 sends a VLAN deleting request of deleting VLAN corresponding to the group ID, to the switch via the communication line 20b (S910).

Thereafter, if necessary, the storage management device 1 may send a packet for storing or validating the switch configuration to the switch 3. The destination of the VLAN releasing request at S906 or the VLAN deleting request at S910 is the management IP address 351 in the switch table 35 acquired at S622 of FIG. 6C.

According to the first embodiment described above, a system administrator configures LUN masking and enters a subnet address of VLAN to which the host 4 and storage device 2 constituting a group belong. With only these works by the system administrator, the storage management device 1 automatically instructs a switch to create VLAN when the host 4 or storage device 2 is connected to the network. The work load for security countermeasure of IP-SAN by the system administrator can therefore be reduced considerably.

Next, a second embodiment will be described. Only different points from the first embodiment will be described. In the second embodiment, the above-described IP-SAN security management is performed by a switch 3.

Figure 10:
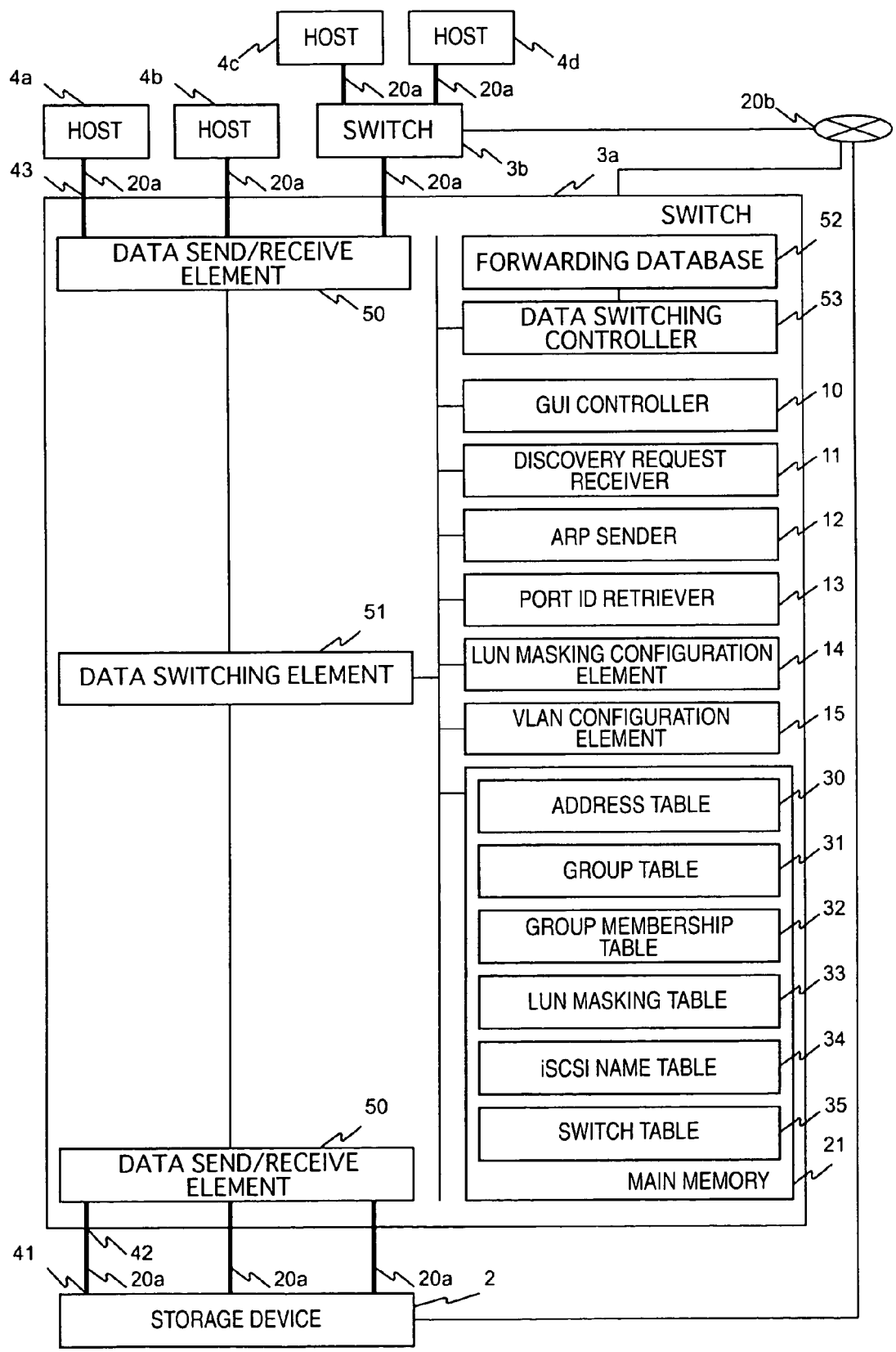
FIG. 10 is a diagram showing an example of a system configuration according to a second embodiment.

FIG. 10 is a diagram showing the configuration of a computer system having a storage device 2, switches 3a and 3b and hosts 4a, 4b, 4c and 4d, respectively connected by communication lines 20a. The storage device 2, switches 3a and 3b are also interconnected by communication lines 20b. In the following, it is assumed that the switch 3a performs the IP-SAN security management.

The switch 3a has: data send/receive elements 50 for receiving data from a network and sending data to the network or a data switching element 51 which is a bus or crossbar switch for sending/receiving data to and from the two data send/receive elements data 50; a forwarding database storage 52; a data switching controller 53 for controlling a data transmission destination of the data send/receive element in accordance with the contents of the forwarding database storage 52; a GUI controller 10, a discovery request receiver 11, an ARP sender 12, a port ID retriever 13, a LUN masking configuration element 14; a VLAN configuration element 15 and a main memory 21.

In this embodiment, although the switch 3a has two data send/receive elements 50, it may have one, three or more data send/receive elements 50. Also in this embodiment, although the GUI controller 10 and the like are realized by hardware, the functions of these may be realized by software programs stored in the main memory 21 similar to the first embodiment.

A management terminal enters configuration information to the switch via a management network.

The main memory stores an address table 30, a group table 31, a group membership table 32, a LUN masking table 33, an iSCSI name table 34 and a switch table 35. A management IP address of a switch different from the switch 3a is registered in the switch table 35.

Figure 11:
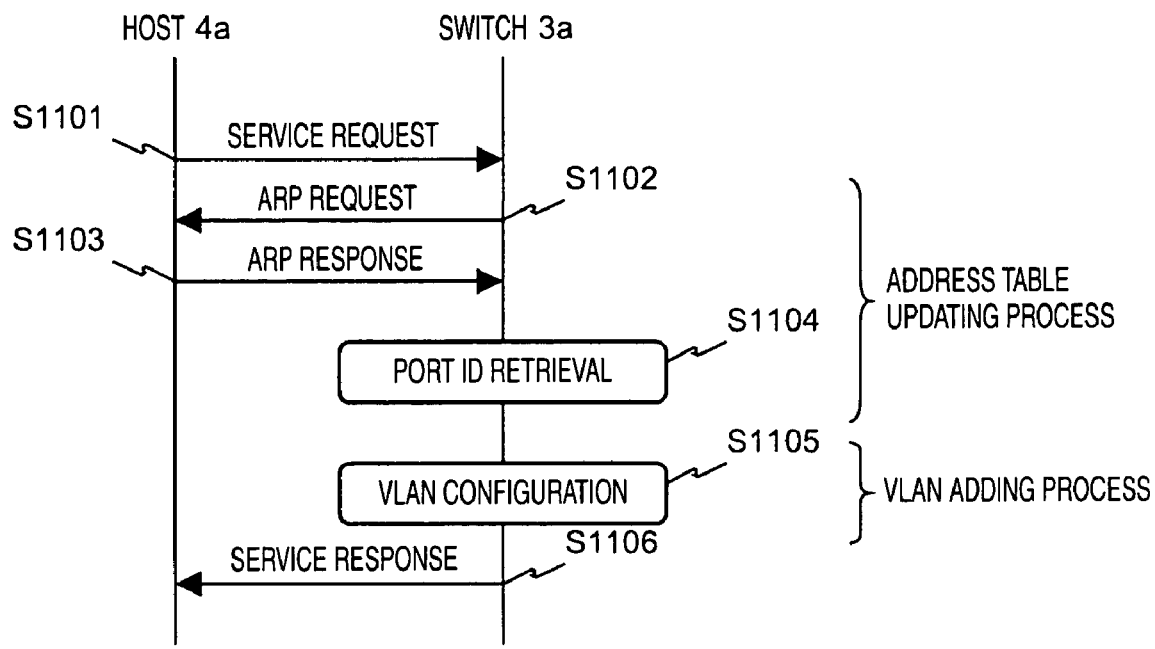
FIG. 11 is a diagram illustrating an example of a communication sequence of the second embodiment.

FIG. 11 is a diagram illustrating a communication sequence to be performed when a host 4a is connected to the switch 3a.

After the host 4a is connected to the switch 3a, the host 4a first sends a service request to the switch 3a (S1101). Upon reception of the service request, the switch 3a sends an ARP request to the host 4a by using the ARP sender 12 to acquire the MAC address of the host 4a (S1102, S1103).

Next, the switch 3a reads the contents of the forwarding database in the forwarding database storage 52 by using the data switching controller 53. The port ID retriever 13 of the switch 3a searches the forwarding database by using the MAC address acquired at S1103. If an entry corresponding to the MAC address is found, the switch 3a judges that the host 4a is connected directly to the switch (without involvement of another switch), and acquires the port ID from the searched entry (S1104).

The VLAN configuration element 15 searches the group key table 31 by using as a key the IP address of the sender of the service request and acquires the group ID 310 of the searched record. The VLAN configuration element 15 requests the data switching element 53 to configure VLAN and add the port ID acquired at S1104 to VLAN having the group ID as its VLAN ID. Thereafter, the data switching element 53 notifies the contents of the received VLAN configuration contents to the data send/receive element 50 so that the data send/receive element 50 can configure VLAN (S1105). Lastly, the discovery request receiver 11 of the switch 3a returns a service response to the host 4a (S1106).

If an entry cannot be found at S1104, the switch 3a performs a process similar to that of the first embodiment. For example, in the communication sequence to be performed when a host 4c is connected to the switch 3b, the sequence similar to that shown in FIG. 6B is performed by replacing the host 4a with the host 4x, the switch 3a with the switch 3b, and the storage management device 1 with the switch 3a.

Next, a third embodiment will be described. In this embodiment, the above-described IP-SAN security management is performed by the storage device 2. In this embodiment, the storage device 2 has the main memory 21 and magnetic disk 23. The main memory 21 stores the GUI controlling program 10, discovery request receiving program 11, ARP sending program 12, port ID retrieving program 13, LUN masking configuring program 14 and VLAN configuring program 15. The magnetic disk 23 stores the address table 30, group table 31, group membership table 32, LUN masking table 33, iSCSI name table 34 and switch table 35. The operation sequence of this embodiment is similar to that of the first embodiment, excepting that the storage management device 1 is replaced with the storage device 2.

According to the present invention, LUN masking and VLAN configuration of IP-SAN can be controlled collectively so that a load of configuration works by a system administrator can be reduced and a miss occurrence rate can be lowered. The running cost of IP-SAN can therefore be lowered.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A management apparatus for managing a storage network having a computer, a storage device and a switch, comprising:
   a controller, an interface connected to said switch and an input interface to be used by an administrator,
   wherein when said computer or said storage device is connected to said switch:
   based on information of first and second identifiers of said computer or said storage device acquired via said interface from said computer or said storage device connected to said switch, information of a correspondence relation acquired from said switch via said interface between said second identifier of said computer or said storage device connected to said switch, and a third identifier for identifying an interface of said switch connected to said computer or said storage device, and information regarding said first identifier for identifying said computer or said storage device constituting a predetermined group entered by said administrator via said input interface, said third identifier of said switch belonging to said predetermined group is specified; and
   in response to inputting of information of a storage area of said storage device and information regarding said first identifier of said computer which can use said storage area, from said input interface, the input information is sent to said storage device to instruct security configuration, information of said third identifier of said switch corresponding to said first identifier and information of said predetermined group to which said third identifier belongs is derived, and the derived information is sent to said switch to instruct configuration of a virtual LAN corresponding to said predetermined group.

2. A management apparatus according to claim 1, wherein said first identifier is an Internet protocol (IP) address, said second identifier is a MAC address, said third identifier is a port ID, and the information regarding said first identifier is a subnet address.

3. A management apparatus according to claim 2, wherein said MAC address is acquired by sending an ARP command to said computer, and the correspondence relation between said MAC address and said port ID is acquired by issuing a Get command of SNMP from said switch.

4. A management apparatus according to claim 3, wherein connection of said computer to said switch is detected upon reception of an SLP packet from said computer connected to said switch.

5. A management apparatus according to claim 1, wherein the contents of an instruction given to said switch is an instruction to add said third identifier to the virtual LAN corresponding to said predetermined group.

6. A management apparatus according to claim 5, wherein if the virtual LAN corresponding to said predetermined group is not configured in said switch, the contents of the instruction is an instruction to generate a new virtual LAN corresponding to said predetermined group.

7. A management apparatus according to claim 6, wherein when said computer or said storage device is disconnected from said switch, said switch is instructed to delete said third identifier corresponding to said disconnected computer or said disconnected storage device from the virtual LAN corresponding to said predetermined group to which said disconnected computer or said disconnected storage device belongs.

8. A management apparatus according to claim 7, wherein if said third identifier corresponding to said disconnected computer or said disconnected storage device is deleted from said virtual LAN corresponding to said predetermined group and if said computer or said storage device belonging to said predetermined group is lost, said switch is instructed to delete said virtual LAN itself.

9. A switch connectable to a computer and a storage device, comprising:
   a controller, an interface connected to said storage device or said computer and an input interface to be used by an administrator,
   wherein when said computer or said storage device is connected to said interface:
   in accordance with information of first and second identifiers of said computer or said storage device acquired via said interface from said computer or said storage device connected, information of a correspondence relation possessed by said switch between said second identifier of said computer or said storage device connected to said switch, and a third identifier for identifying an interface of said switch connected to said computer or said storage device, and information regarding said first identifier for identifying said computer or said storage device constituting a predetermined group entered by said administrator via said input interface, said controller identifies said third identifier corresponding to said computer or said storage device belonging to said predetermined group; and
   in response to inputting of information of a storage area of said storage device and information regarding said first identifier of said computer which can use said storage area, from said input interface, input information is sent to said storage device to instruct security configuration, information of said third identifier corresponding to said first identifier and information of said predetermined group to which said third identifier belongs is derived, a virtual LAN corresponding to said predetermined group is configured.

10. A storage device connectable to a switch connected to a computer, comprising:
    a controller, an interface connected to said switch, an input interface to be used by an administrator and a storage area,
    wherein when said computer is connected to said switch:
    based on information of first and second identifiers of said computer acquired via said interface from said computer connected, information of a correspondence relation acquired from said switch via said interface between said second identifier of said computer connected to said switch and a third identifier for identifying said interface of said switch connected to said computer, and information regarding said first identifier for identifying said computer constituting a predetermined group entered by said administrator via said input interface, said third identifier corresponding to said computer belonging to said predetermined group is identified; and in response to inputting of information of said storage area and information regarding said first identifier of said computer which can use said storage area, from said input interface, security configuration is performed, information of said third identifier corresponding to said first identifier and information of said predetermined group to which said third identifier belongs is derived, and said switch is instructed to configure a virtual LAN corresponding to said predetermined group.

11. A management method for managing a storage network having a computer, a storage device and a switch, comprising the steps of:

when said computer or said storage device is connected to said switch:

based on information of first and second identifiers of said computer or said storage device acquired from said computer or said storage device connected to said switch, information of a correspondence relation acquired from said switch between said second identifier of said computer or said storage device connected to said switch, and a third identifier for identifying an interface of said switch connected to said computer or said storage device, and information regarding said first identifier for identifying said computer and said storage device constituting a predetermined group, specifying said third identifier corresponding to said computer or said storage device belonging to said predetermined group; and based on information of a storage area of said storage device and information regarding said first identifier of said computer which can use said storage area, performing security configuration by said storage device, extracting information of said third identifier corresponding to said first identifier and information of said predetermined group to which said third identifier belongs, and creating through said switch a virtual LAN corresponding to said predetermined group.

* * * * *